(12) United States Patent
Nesselrotte

(10) Patent No.: US 6,735,881 B1
(45) Date of Patent: May 18, 2004

(54) FIREWOOD MEASURING AND MARKING APPARATUS

(76) Inventor: Robert F. Nesselrotte, 1320 1/2 Lincoln Ave., Plattsmouth, NE (US) 68048

(*) Notice: Subject to any disclaimer, the term of this patent is extended or adjusted under 35 U.S.C. 154(b) by 0 days.

(21) Appl. No.: 10/358,685

(22) Filed: Feb. 5, 2003

Related U.S. Application Data

(60) Provisional application No. 60/358,038, filed on Feb. 19, 2002.

(51) Int. Cl.[7] .................................................. B43L 7/10
(52) U.S. Cl. ............................ 33/666; 33/464; 33/809; 222/174
(58) Field of Search ................................ 33/19.2, 32.1, 33/32.2, 41.1, 41.6, 452, 464, 521, 630, 666, 809; 222/173, 174

(56) References Cited

U.S. PATENT DOCUMENTS

| | | | | |
|---|---|---|---|---|
| 160,471 A | * | 3/1875 | Robinson | 33/666 |
| 677,339 A | * | 7/1901 | Comstock | 33/666 |
| 1,048,132 A | * | 12/1912 | Burke | 222/174 |
| 2,765,007 A | * | 10/1956 | Hoffmann | 33/630 |
| 3,070,827 A | * | 1/1963 | Ames | 222/174 |
| 3,094,787 A | * | 6/1963 | Moore | 33/809 |
| 3,364,580 A | * | 1/1968 | Lucia | 33/630 |
| 3,531,870 A | * | 10/1970 | Romancky | 33/630 |
| 4,233,739 A | * | 11/1980 | Hinrichs | 33/630 |
| 4,299,034 A | * | 11/1981 | DeBetta | 33/630 |
| 4,319,404 A | * | 3/1982 | Brock | 33/630 |
| 4,561,186 A | * | 12/1985 | Keefe | 33/630 |
| 4,984,371 A | * | 1/1991 | Fredrickson | 33/630 |
| 5,309,642 A | * | 5/1994 | McGinnis | 33/32.2 |
| 5,901,457 A | * | 5/1999 | Harding | 33/809 |
| 6,295,738 B1 | * | 10/2001 | Risch | 33/630 |
| 6,546,634 B2 | * | 4/2003 | Ming | 33/809 |
| 6,658,753 B2 | * | 12/2003 | Tatarnic | 33/809 |
| 2002/0170189 A1 | * | 11/2002 | Cheatham | 33/464 |

* cited by examiner

Primary Examiner—G. Bradley Bennett

(57) ABSTRACT

A firewood measuring and marking apparatus includes an elongated base member with a marker mounted generally vertically on one end. The marker has a downwardly projecting tip for marking a log when pressed against the log. The base member has an adjustable extension arm to permit various predetermined lengths to be marked on the log to be cut.

13 Claims, 2 Drawing Sheets

1

FIREWOOD MEASURING AND MARKING APPARATUS

CROSS-REFERENCES TO RELATED APPLICATIONS

Applicant claims the benefit of U.S. Provisional Application Ser. No. 60/358,038, filed Feb. 19, 2002.

STATEMENT AS TO RIGHTS TO INVENTIONS MADE UNDER

FEDERALLY SPONSORED RESEARCH AND DEVELOPMENT

Not Applicable

BACKGROUND OF THE INVENTION (1) Field of the Invention

The present invention relates generally to measuring apparatus, and more particularly to an improved apparatus for measuring and marking logs and similar products for cutting into uniform lengths.

(2) Background Information

Environmental issues have made the use of wood-burning stoves and fireplaces quite prevalent in many homes. Obviously, this means that there is a proportional increase in the amount of firewood desired for consumption in those fireplaces and stoves. Whether a consumer cuts the wood himself, or hires others to do this job, the task of cutting trees into appropriate sized logs for use in a fireplace can be tedious and time-consuming.

One of the difficulties is in cutting the logs to a length that fits conveniently within the firebox of a wood-burning stove, or on the rack of a fireplace. Nothing is more frustrating than to complete a job of cutting a tree into logs for a stove, only to find that many of the logs are too long to fit in the firebox.

BRIEF SUMMARY OF THE INVENTION

It is therefore a general object of the present invention to provide an improved apparatus for measuring and marking firewood.

A further object of the present invention is to provide an improved firewood measuring and marking apparatus that is simple to use.

Yet another object is to provide a firewood measuring and marking apparatus that accurately marks log lengths of uniform dimension.

Still a further object of the present invention is to provide an improved firewood measuring and marking apparatus that is economical to manufacture.

These and other objects will be apparent to those skilled in the art.

The firewood measuring and marking apparatus of the present invention includes an elongated base member with a marker mounted generally vertically on one end. The marker has a downwardly projecting tip for marking a log when pressed against the log. The base member has an adjustable extension arm to permit various predetermined lengths to be marked on the log to be cut.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
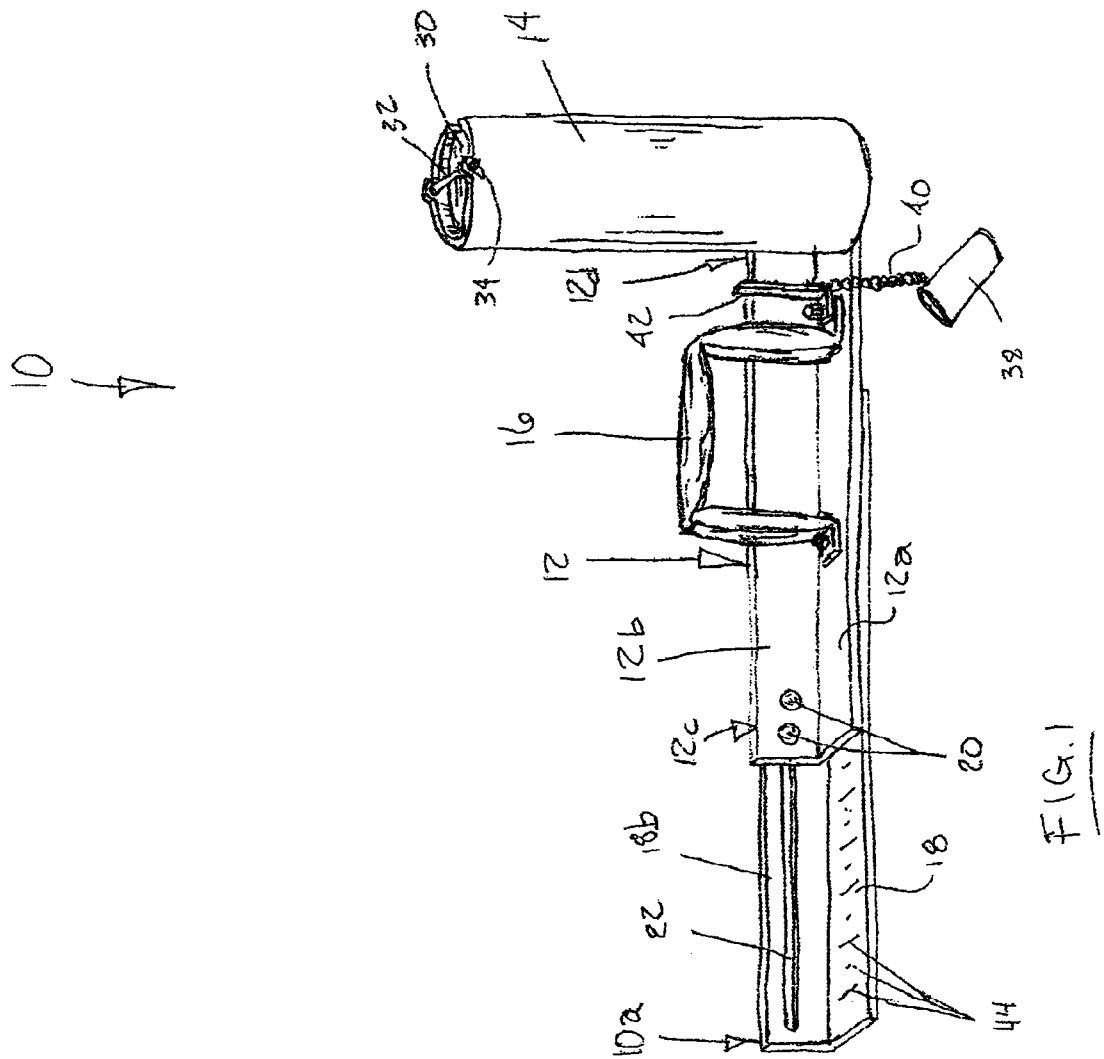
FIG. 1 is a perspective view of the measuring and marking apparatus of the present invention.

Referring now to the drawings, in which similar or corresponding parts are identified with the same reference numeral, and more particularly to FIG. 1, the firewood measuring and marking apparatus of the present invention is designated generally at 10 and includes a base member 12, a marker housing 14, a handle 16 and a selectively extensible extension arm 18.

Base member 12 is preferably a rigid steel angle having a horizontal base leg 12a and a vertical leg 12b. Base member 12 has opposing longitudinal ends 12c and 12d, with the marker housing 14 affixed to end 12d. Extension arm 18 is also an elongated steel angle with a horizontal leg 18a and vertical leg 18b, and is connected in slidable, nested relation to base member 12.

Figure 3:
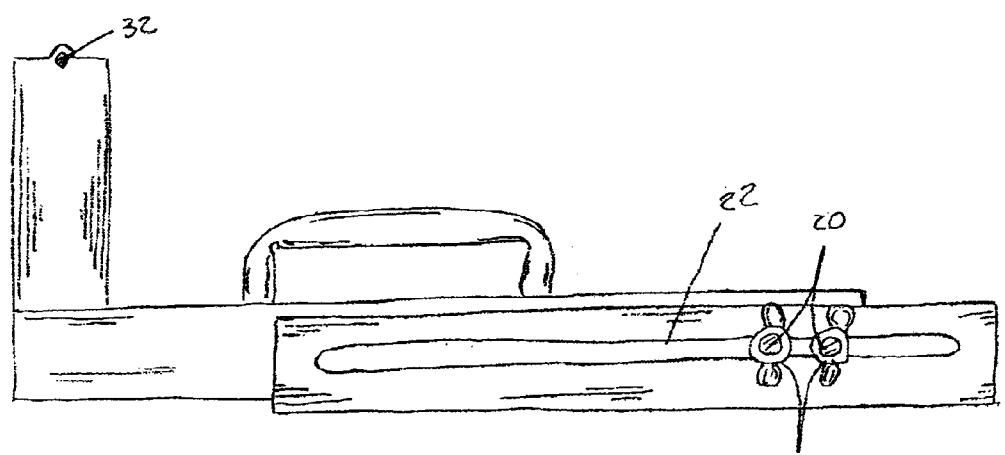
FIG. 3 is a rear elevational view of the invention.
Figure 4:
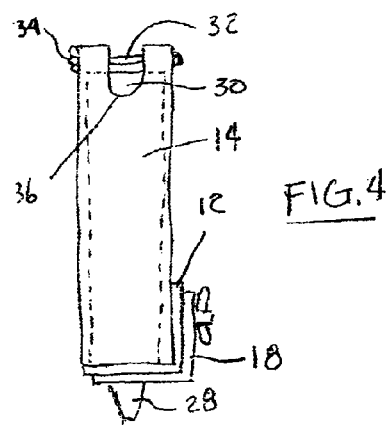
FIG. 4 is elevational view taken from the right end of FIG. 2.

A pair of bolts 20 are mounted in spaced-apart, horizontal alignment through a pair of apertures in vertical leg 12b of base member 12, proximal to end 12a. These bolts 20 project through an elongated horizontal slot 22 formed in the vertical leg 18b of extension arm 18. As shown in FIGS. 3 and 4, a pair of wingnuts 24 are tightened on bolts 20 to selectively fasten extension arm 18 in the desired position. This position may be adjusted to lengthen or shorten the length at which a log is to be marked, as describe in more detail below.

Figure 2:
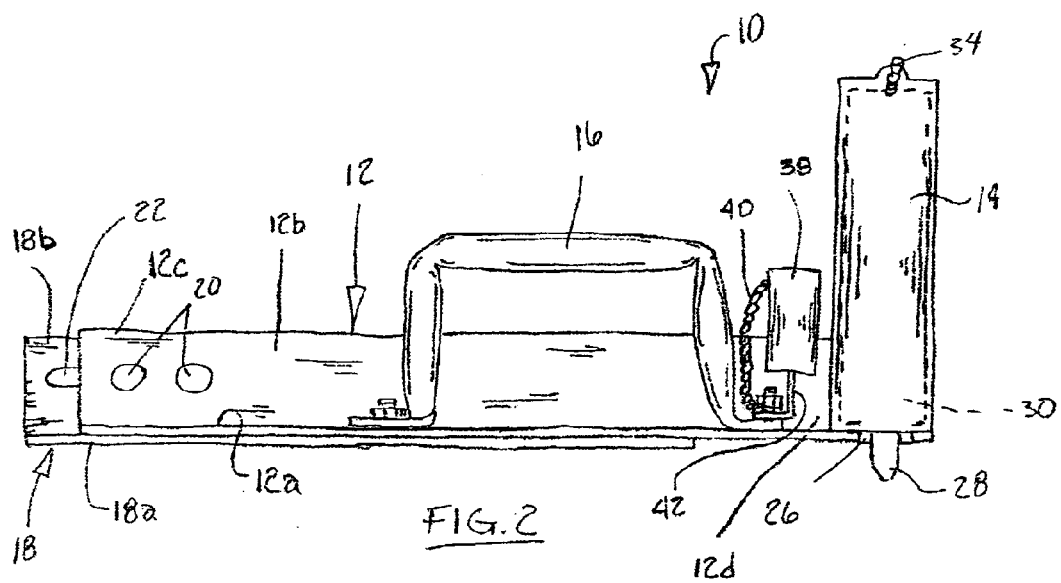
FIG. 2 is a front elevational view of the invention.

Referring to FIGS. 1 and 2, handle 16 is an inverted U-shaped tubular member with its legs mounted to the horizontal leg 12a of base member 12. The marker housing 14 is preferably a cylindrical tube mounted in a vertical orientation on end 12d of base member 12. A slot 26 in horizontal leg 12a of base member 12 will permit the nozzle 28 of a paint can 30 to project downwardly through base member 12 for use in marking the wood, as described below.

A pin 32 is selectively secured with a wingnut 34 through a pair of diametric apertures formed through the upper ends of walls of housing 14 and are located to retain the paint can 30 in an inverted position secured against the base member 12. A notch 36 in the upper end of the housing 14 permits the user to remove the paint can 30 from housing 14, once pin 32 is removed.

A tubular paint tip guard 38 is secured to base member 12 by a chain 40, and is attached over the paint tip/nozzle 28 during transport of the device 10 to protect the tip and prevent accidental spraying of paint. When not in use, the guard 38 is stored on post 42, projecting upwardly from base member 12, as shown in FIG. 2.

In operation, extension arm 18 is first adjusted to the desired length for the wood being cut. In the preferred embodiment, the distance from the paint tip 28 to the opposite end of the base member 12 is 14 inches. The extension arm 18 may be extended to a total length of about 26 inches. Printed indicia or other markings 44 may be embossed or printed on extension arm 18, to permit extension arm to be adjusted without mechanically measuring the overall length of the device 10. The paint tip guard 38 is then removed from the paint tip 28, and stored on the post 42.

The device 10 is then placed on the branch or log to be cut into firewood, with the end 10a of the device positioned on the last cut made, or on a previously positioned mark on the wood. The paint can 30, shown in FIG. 2, is of a type that will dispense paint in an inverted position, when the paint tip 28 is pressed. The marking end 10b of the device 10 is then pressed down onto the tree, so that a mark is painted on the tree. The device 10 is then repositioned for the next mark.

Whereas the invention has been shown and described in connection with the preferred embodiment thereof, many modifications, substitutions and additions may be made which are within the intended broad scope of the appended claims.

What is claimed is:

1. A firewood measuring and marking apparatus, comprising:
    a horizontally-oriented, elongated base member having opposing first and second longitudinal ends, and a lower surface;
    a generally vertically-oriented marker housing affixed to the base member first end, and having upper and lower ends;
    an operable marker removably mounted within the marker housing;
    said marker including a marker tip projecting from a lower end of a supply container, and operable to spray marking fluid upon the upward movement of the tip toward the supply container;
    means for securing the marker within the housing with the marker tip projecting downwardly beyond the lower end of the marker housing and below the lower surface of the base member;
    said marker tip located a predetermined distance from the base member second end.

2. The firewood measuring and marking apparatus of claim 1, wherein said marker housing is an elongated tubular member.

3. The firewood measuring and marking apparatus of claim 2, wherein said means for securing the marker within the marker housing includes:
    said marker housing mounted on top of the base member, such that the base member covers the lower end of the housing;
    said base member first end having a slot formed therethrough of a size to permit the marker tip to project therethrough but preventing the supply container from passing therethrough;
    an elongated bolt extending through diametric apertures formed in the upper end of the housing; and
    a removable fastener on an end of said bolt for selective securement of the bolt to the housing.

4. The firewood measuring and marking apparatus of claim 3, wherein said base member further includes an elongated extension arm adjustably connected thereto for selective extension and retraction along a longitudinal axis of the base member.

5. The firewood measuring and marking apparatus of claim 3, wherein said base member is an angle having a horizontal longitudinal leg and a vertical longitudinal leg, and wherein said extension arm is an angle having a horizontal longitudinal leg and a vertical longitudinal leg, and wherein the extension arm angle is adjustably and slidably connected to the base member with the horizontal legs and vertical legs of the base member and extension arm in longitudinal slidable contact with one another.

6. The firewood measuring and marking apparatus of claim 5, wherein said base member horizontal leg is located over the top of the extension arm horizontal leg, and wherein said extension am horizontal leg has indicia on an upper surface thereof and extending from end to end indicating the combined length of the extension arm and base member.

7. The firewood measuring and marking apparatus of claim 6, wherein said base member horizontal leg further includes a handle mounted on the upper surface thereof, for positioning and transporting the apparatus.

8. The firewood measuring and marking apparatus of claim 7, further comprising a cylindrical tube having dimensions to slide over the marker tip and prevent the marker from being activated, said tube operably connected to the base member to move between storage a position on the base member and a marker protecting position on the marker tip.

9. The firewood measuring and marking apparatus of claim 1, wherein said base member further includes an elongated extension arm adjustably connected thereto for selective extension and retraction along a longitudinal axis of the base member.

10. The firewood measuring and marking apparatus of claim 9, wherein said base member is an angle having a horizontal longitudinal leg and a vertical longitudinal leg, and wherein said extension arm is an angle having a horizontal longitudinal leg and a vertical longitudinal leg, and wherein the extension arm angle is adjustably and slidably connected to the base member with the horizontal legs and vertical legs of the base member and extension arm in longitudinal slidable contact with one another.

11. The firewood measuring and marking apparatus of claim 10, wherein said base member horizontal leg is located over the top of the extension arm horizontal leg, and wherein said extension arm horizontal leg has indicia on an upper surface thereof and extending from end to end indicating the combined length of the extension arm and base member.

12. The firewood measuring and marking apparatus of claim 1, wherein said base member further includes a handle mounted thereon for positioning and transporting the apparatus.

13. The firewood measuring and marking apparatus of claim 1, further comprising a cylindrical tube having dimensions to slide over the marker tip and prevent the marker from being activated, said tube operably connected to the base member to move between storage a position on the base member and a marker-protecting position on the marker tip.

* * * * *